United States Patent [19]

Trinidad et al.

[11] Patent Number: 4,868,851
[45] Date of Patent: Sep. 19, 1989

[54] SIGNAL PROCESSING APPARATUS AND METHOD

[75] Inventors: John M. Trinidad, Mendon; Hendrik J. Keesom, Webster, both of N.Y.; C. Wayne Buhrman, Annapolis, Md.; Dedina M. Heinrich, Webster, N.Y.

[73] Assignee: Harris Corporation

[21] Appl. No.: 148,707

[22] Filed: Jan. 26, 1988

[51] Int. Cl.$^4$ .......................... H04B 7/08; H04L 1/02
[52] U.S. Cl. ...................................... 375/40; 375/116; 371/36
[58] Field of Search .................. 375/94, 110, 40, 100, 375/107, 116, 113; 371/36, 37; 455/133–135

[56] References Cited

U.S. PATENT DOCUMENTS 3,409,875  11/1968  De Jager et al. ...................... 375/40
4,063,174  12/1977  Gupta et al. .......................... 375/40

Primary Examiner—Robert L. Griffin
Assistant Examiner—Marianne Huseman
Attorney, Agent, or Firm—Rogers & Killeen

[57] ABSTRACT

Apparatus and method for processing a common digital signal received at plural receivers in which each received signal is validated and aligned in time with the other signals. A single output signal is generated from the received signals using a voting scheme such as one in which the logic state of the majority of corresponding bits in the received signals determines the logic state of the bits in the generated signal. If there is no majority, the logic state of the best performing signal is used without revoting, or the vote is retaken without the poorest performing signal.

23 Claims, 3 Drawing Sheets

SIGNAL PROCESSING APPARATUS AND METHOD

BACKGROUND OF THE INVENTION

The invention relates to an apparatus and method for processing a received digital signal such that the resultant signal has a very high probability of matching, bit-by-bit, the originally transmitted signal.

Digital signals carry information comprised of binary digits of data, known simply as bits. The bits have a logic state characterized either as zero or one, and a change in logic state is a bit transition. Multiple bits may be grouped to represent characters, such as letters, numbers or control signals. Multiple characters may be grouped in packets to form messages. The packets may be transmitted via a radio frequency ("RF") carrier for receipt at a remote location as is well known in the prior art. Packets may also be transmitted along optical fibers and other known communications media.

When transmitting digital information from point-to-point it is usually desired that the received signal precisely match the transmitted signal, i.e., that the radio transmission be received with a very low error rate. A low error rate is important for many applications such as in a digital encryption system used for communication security. This can be accomplished when the data in the transmitted signal and the data in the received signal are identical, or nearly so. Problems arise, however, when the transmitter and receiver are remote and the mode of transmission is means such as high-frequency (HF) radio or via satellite. Atmospheric interference, topographic interference, and multipath time delays caused by travel over different transmission paths often distort the received signal, increasing the error rate.

If an error-free transmission path cannot be assured, the signal may be restored to its original form at the receiving site. One known method is to use multiple receivers that are either diverse in space or diverse in frequency (if the transmitter is similarly configured) and to accept the signal from the receiver adjudged to have the best (or most accurate) signal. One problem often encountered in such systems is the framing or aligning of bits in time from several receivers. While all receivers are receiving the same source signal, that signal has been affected by the different interferences encountered in the different paths taken to reach the plural receivers, by the differences in the response of the receivers, and by the different lengths of the paths to geographically diverse receivers.

The Ikeda and Mitani U.S. Pat. No. 4,015,205 dated March, 1977 discloses a device that elongates the bit information, causing the bits from plural received signals to overlap, assuring an uninterrupted data flow when receivers are switched in response to changing signal strength. Time aligning is accomplished in the Shiki and Ohmori U.S. Pat. No. 4,384,358 dated May 17, 1983 with heterodyne receiver circuits and a phase detector to zero the phase difference.

Another complex problem often encountered is selecting which signal is the most accurate. Two known techniques for signal selection are: (1) selecting the signal with the best signal-to-noise ratio (including variations such as selecting the strongest signal) and (2) generating a new signal using information from several signals (e.g., adding portions from each received signal).

The Hamada U.S. Pat. No. 4,403,343 dated Sept. 6, 1983 discloses a switching device that selects the signal with the strongest reception and switches the output signal to the selected signal. The device disclosed in the Mohr and Stacer U.S. Pat. No. 3,651,406 dated Mar. 21, 1972 includes a switch that selects the signal with the best signal-to-noise ratio. The device in the Jayant U.S. Pat. No. 3,997,844 dated Dec. 14, 1976 selects the signal with the largest autocorrelation function value. These and similar prior art switching devices, in general, often introduce inaccuracies during the time that switching actually takes place, (e.g. one or two bits can be lost). Further, they frequently rely on the inputs from only one signal at a time and ignore the information contained in the other signals.

The receiver in the Shiki '358 patent combines plural signals after reducing their amplitude dispersion by suppressing the received signal with the greater amplitude versus frequency dispersion. Other receivers that combine signals include the Alter U.S. Pat. No. 4,347,627 dated Aug. 31, 1982, the Tatsuzawa et al. U.S. Pat. No. 4,216,428 dated Aug. 5, 1980, and the Hill U.S. Pat. No. 3,934,204 dated Jan. 20, 1976. Frequently, receivers which combine signals are not highly accurate, because invalid signals are added to valid ones and because there is often no way to assess the best output logic state when corresponding bits from received signals cancel each other (e.g., a one and a zero).

Therefore, an object of the present invention is to provide a novel and accurate signal processing apparatus and method that obviate these and other problems of the prior art.

It is another object of the present invention to provide a signal processing apparatus and method which ignores known erroneous signals.

It is yet another object of the present invention to provide a signal processing apparatus and method which uses all signals that are not known to be erroneous.

It is a further object of the present invention to provide a signal processing apparatus and method which resolves situations wherein there are equal numbers of signals with conflicting information.

It is another object of the present invention to provide a signal processing apparatus and method which avoids data losses that occur during conventional receiver switching.

Accordingly, the apparatus and method for processing a common digital signal received at plural receivers in the present invention provide a single output signal by using acceptable portions of the received signals in a voting scheme that determines the logic state of each bit in the output signal. Before the signals participate in the vote, they are synchronized in a novel multi-matrix alignment process. A voting algorithm determines the majority logic state of each frame in the received signals. The present invention also maintains statistics to determine the history of correctly receiving data from a particular signal. If the vote is a tie, the output signal uses the logic state of the corresponding bit in the signal with the best history of having correct data, or it revotes without the signal with the poorest history of being correct.

DETAILED DESCRIPTION OF THE PREFERRED EMBODIMENTS

Figure 1:
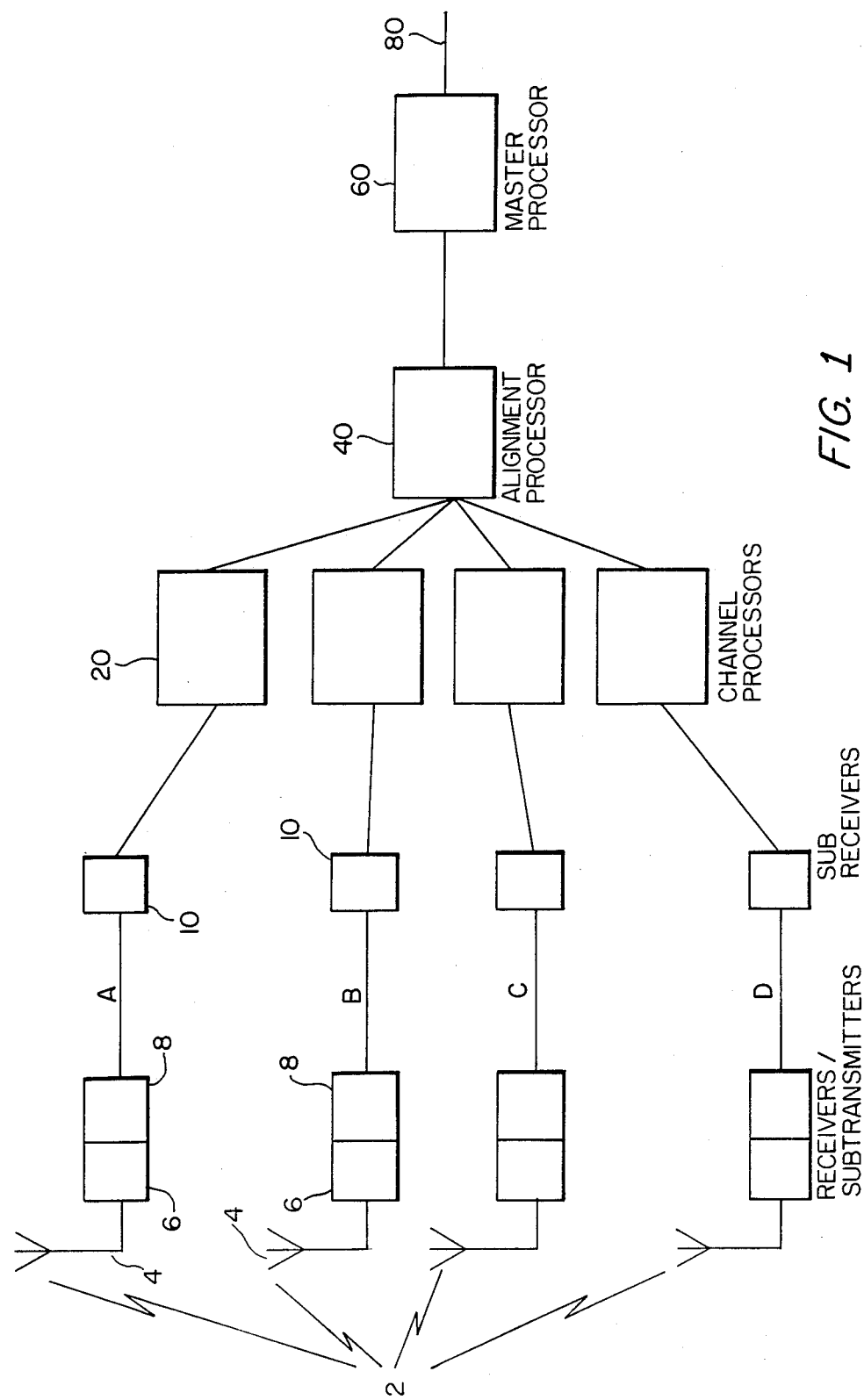
FIG. 1 is a block diagram of a preferred embodiment of a signal processing system in accordance with the present invention.

With reference to FIG. 1, a signal processing system of the present invention may include a common digital signal 2 received on plural antennas 4, each connected to a receiver unit 6. The signal processing system in FIG. 1 is illustrated as receiving four signals, however the present invention requires reception of any number of plural signals. The receivers 6 are connected to subtransmitters 8 that retransmit the received signals A-D to subreceivers 10. Each received signal A-D is routed to channel processors 20 for acceptance or rejection, then to an alignment processor 40 for synchronization and to a master processor 60 for voting and for generating an output signal 80.

The antennas 4 and receivers 6 are mutually geographically remote in the embodiment of FIG. 1. Alternatively, the antennas and receivers may be collocated and they may be diverse in frequency, if the common signal 2 they receive is similarly configured.

In operation, the common digital signal 2 may be generated by a single transmitter which is broadcasting omnidirectionally, such as a radio on a ship. The common signal 2 is received by each of the mutually remote antennas 4 and associated receivers 6. The received signals are then relayed or retransmitted by the subtransmitters 8 to the subreceivers. Thus, the remotely received signals 2 are provided to a central facility for further processing, as is further described below.

Figure 2:
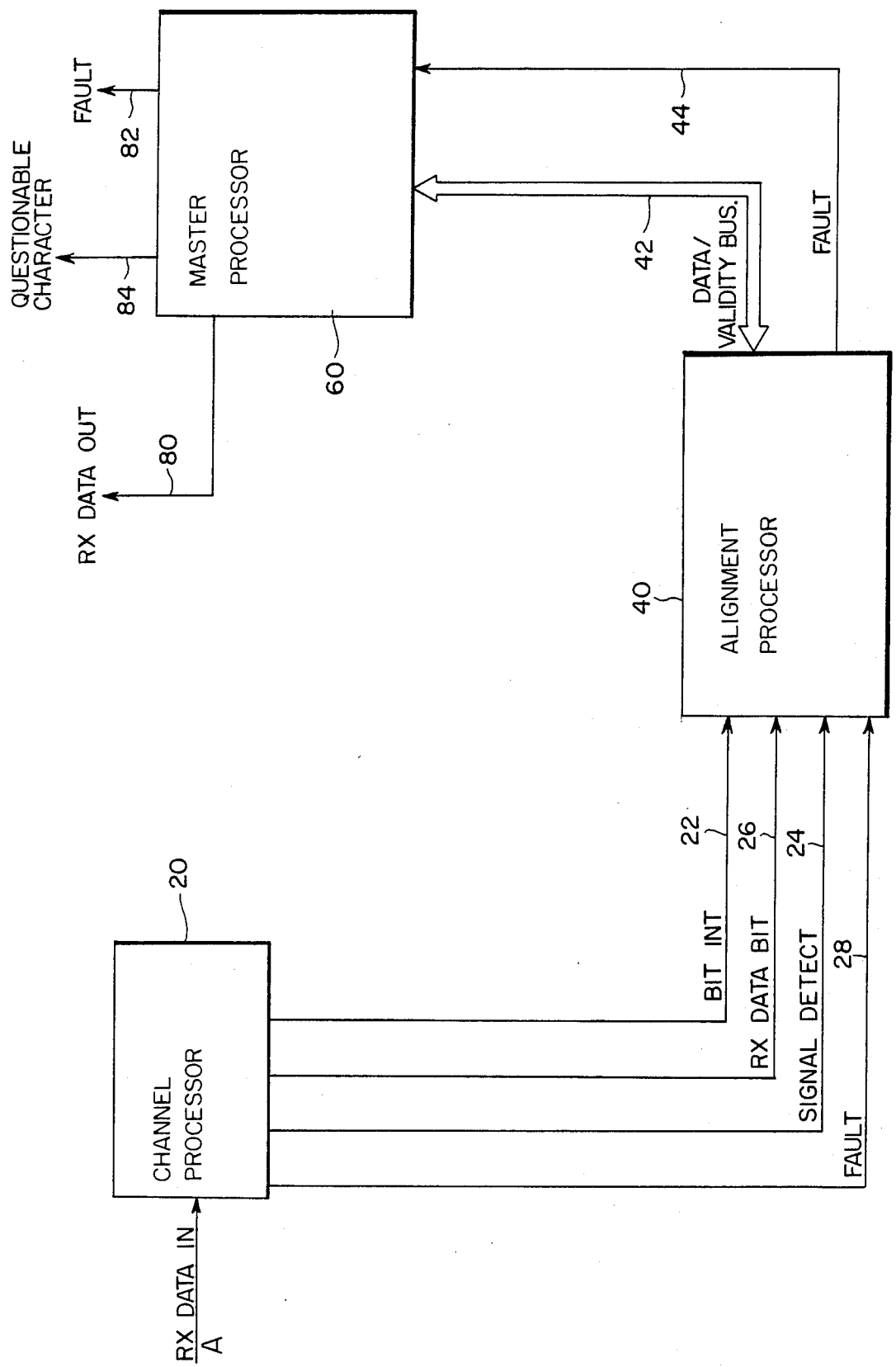
FIG. 2 is a block diagram of a command and data flow which may be used flow used in the signal processing system of FIG. 1.

With reference to FIG. 2, a channel processor 20 receives information from a single received signal A. Channel processors for additional received signals are not shown. It is possible that the channel processor 20 can operate sufficiently fast so that a single channel processor 20 can process more than one received signal; however, for simplicity of explanation a single channel processor 20 for each received signal A is described herein. Each channel processor 20 may comprise elements which perform the functions of bit transition detecting, of character generating and character examining.

The channel processor 20 receives the signal A as a data stream of individual bits. The integrity of each bit is verified in the bit transition detector using a transition windowing scheme. An initial negative edge of a bit starts the transition detection phase. The time of the next bit window is calculated from a pre-determined bit rate (e.g., 75 bit/sec yields windows of 13.3 msec). When each new bit is available, the channel processor sends a bit interrupt signal on a BIT INT line 22. If a bit transition occurs outside of the approved window, that particular bit is assumed to be questionable and is flagged as a bit error.

After each bit is received, sampled and checked for misplaced transitions, it is grouped with other bits to form a character. Once an entire character has been received, the character is examined to compare it to predetermined patterns to determine whether it is valid. The types of characters considered valid at a given point in time will depend upon the perceived state of the incoming bit stream. If this is the first character, the only acceptable type of received character would be phasing. If however, other characters had already been received, the channel processor may accept more character types.

In order to move from one perceived state to the next, the channel processor must receive a minimum number of valid characters before the number of invalid characters reaches the drop threshold. If the drop threshold is reached before enough valid characters are received, the state of the incoming signal is dropped to a prior state. As a signal is first detected after an inactive state, the channel processor must see a minimum number of valid phasing characters. Once this occurs, it considers a valid signal present, and activates the signal detect line 24. After this, either phasing, data, or mark-hold characters are acceptable. As soon as a minimum of data characters is received, the status is again updated. Mark-hold does not alter the current state and may consist of one character or may be present for an extended period of time. The received data line 26 feeds valid data to an alignment processor 40. Channel processor faults are signaled to the alignment processor 40 on fault line 28.

With further reference to FIG. 2, the alignment processor 40 comprises a memory and time alignor. The alignment processor is primarily responsible for framing the incoming data streams from all channel processors. The term framing is used to mean the accumulation in frames of the same bit from all received signals, i.e., synchronizing the signals. The alignment processor may also apply a mask to the bits indicating their validity.

The memory portion of the alignment processor 40 includes three matrices: a receive bit matrix, a validity matrix and a reporting matrix. As each new bit is received from a channel processor, it is stored in the receiver bit matrix row for that signal and in the column for the next frame. The bit's validity is stored in the corresponding position in the validity matrix and it is reported present in the same position in the reporting matrix.

If a signal appears operational, but for some reason should fail to send a bit, the memory detects this failure through the use of a bit timer for each signal. If the bit timer times out before a new bit is received, the bit is considered invalid and is marked invalid in the validity matrix.

The time alignor portion of the alignment processor 40 monitors the reporting matrix and begins transferring bits by frame when all signals are reporting bits or according to a bit timer if all signals do not report. The alignor strips off one frame of bits at a time from the receive bit matrix and sends it, and the corresponding validity masks from the validity matrix, to a master processor 60 via a data/validity bus 42. Alignment processor faults are indicated on fault line 44.

With further reference to FIG. 2, the master processor 60 comprises a counter, a recorder and a signal generator. It is responsible for combining the framed bits from the alignment processor 40 into one output stream 80. The master processor 60 uses a voting algorithm and a history of each signal's performance to create the new data stream of bits. The master processor 60 also receives the fault indications from channel processors 20 and the alignment processor 40, using these to evaluate the operational status of the apparatus and to report apparatus faults to users via a fault line 82. Characters reported as questionable by the voting algorithm are reported to users via a questionable character line 84.

The counter uses the voting algorithm to determine the majority logic state of each frame of bits. For example, if four signals are reporting valid bits and three of the four bits have logic state 1, the majority logic state for this frame would be 1. The recorder tracks how often each signal has bits with the same logic state as the majority logic state determined by the counter. This information will be used later by the counter to determine the logic state for a frame when there is no majority (e.g., two bits have logic state 1, two have logic state 0). The signal generator creates an output signal 80 with the logic state of each bit relating frame-by-frame to the logic state determined by the counter.

Figure 3:
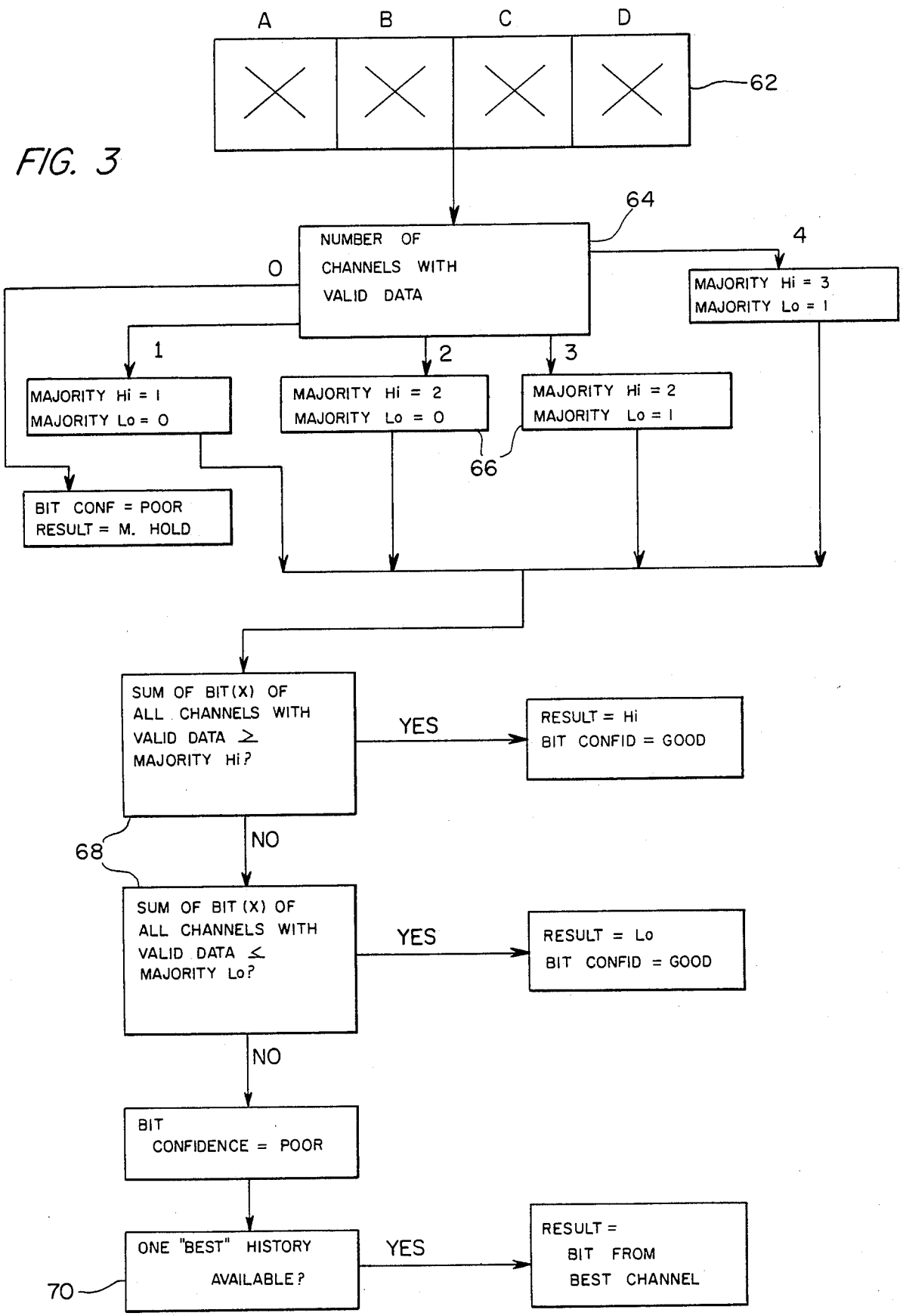
FIG. 3 is a preferred embodiment of a voting algorithm which may be used in the signal processing system of FIG. 1.

With reference to FIG. 3, the voting algorithm in the counter may be illustrated by a flow chart the logic of which may be implemented in conventional digital hardware or software. The algorithm begins with a determination of the number of signals with valid data. The validity mask for each bit in each frame of data 62 is checked and the total number of valid bits is calculated 64. The number of valid bits is used to select the appropriate majority requirement 66. The logic states in each frame are added and compared to the requirement 68. For example, if there are three bits available in a particular frame, and two have logic state 1 and one has logic state 0, the total of the logic states would be 2. The sum, 2, matches the "Majority Hi" requirement, and the resultant majority logic state is "Hi," or 1 (when re-translated to a binary logic state). If, on the other hand, two bits were 0 and one was 1, the total would be 1, and the majority logic state would be "Lo."

If there is no majority logic state, the algorithm continues 70 with a search of the historical file in the recorder. The algorithm uses the logic state of the bit in the appropriate frame of the signal with the best history of supplying bits with logic states matching the majority logic state.

In an alternative embodiment of this algorithm, the tie vote situation can be resolved by repeating the entire voting algorithm after removing the input from the signal with the poorest history of having bits with logic states matching the majority.

These and many other advantages of the present invention will be readily apparent to one skilled in the art from the claims. It should be understood that the foregoing description of the preferred embodiments are illustrative only, and that many modifications may be made without departing from the spirit thereof as defined in the claims when accorded a full range of equivalents.

We claim:

1. Apparatus for radio frequency signal processing, comprising:
   plural receivers, each receiver being mutually geographically remote and receiving a common radio signal conveying plural bits of information, said bits being carried in plural frames;
   plural sub-transmitters, each sub-transmitter being operatively connected to one of said receivers and retransmitting the received radio signal;
   plural collocated sub-receivers each receiving the retransmitted radio signal from one of said sub-transmitters;
   plural bit transition detectors, each detector being operatively connected to one said sub-receiver, for examining the bit transitions in the received radio signal and discarding those bits with transitions falling outside of predetermined time windows;
   plural character generators, each generator being operatively connected to one said bit transition detector, for generating characters from a predetermined number of said bits in said received radio signal;
   plural character examiners, each examiner being operatively connected to one said character generator, for comparing said characters to predetermined characters and discarding those characters that do not match one of the predetermined characters;
   a memory, operatively connected to said character examiners, for sequentially storing for each received radio signal a plurality of the bits with accepted bit transitions from accepted characters;
   a bit aligner, operatively connected to said memory, for storing each of the bits by frame so that bits from said plural received radio signals are aligned in time;
   a counter, operatively connected to said bit aligner, for determining the majority logic state of the bits of each frame; and
   a signal generator forming an output signal carrying plural output bits of digital information with the logic state of each output bit relating frame-by-frame to the majority logic state, and if there is no majority logic state for a frame, to a second logic state.

2. The apparatus of claim 1, further comprising:
   a recorder, operatively connected to said counter, for recording how frequently each of said received radio signals has bits in the logic state matching said majority state; and
   a signal generator wherein, the second logic state relates to the logic state of the corresponding bit in the received radio signal that most frequently has bits matching the majority logic state.

3. The apparatus of claim 1, further comprising:
   a recorder, operatively connected to said counter, for recording how frequently each of said received radio signals has bits in the logic state matching said majority state; and
   a signal generator wherein, the second logic state relates to the logic state of a second majority logic state determined by said counter not including the received radio signal that least frequently has bits matching the majority logic state.

4. Apparatus for signal processing, comprising:
   plural means for receiving signals carrying plural framed bits of information from a common signal;
   plural means for rejecting mistimed or improperly formatted received signals;
   means for time-aligning, in frames, bits from the received signals;
   means for determining the majority logic state of the bits in each frame; and
   means for generating an output signal carrying plural output bits, wherein the logic state of each output bit relates to said majority logic state, and when there is not a majority logic state, the logic state of each output bit relates to the logic state of the corresponding bit in the received signal with the best history of having bits matching said majority logic state.

5. The apparatus of claim 4, wherein said received signals are diverse in frequency.

6. The apparatus of claim 4, wherein said means for receiving signals are collocated.

7. The apparatus of claim 4, wherein said means for receiving signals are mutually geographically remote.

8. Apparatus for signal processing, comprising:
plural means for receiving signals carrying plural framed bits of information from a common signal;
plural means for rejecting mistimed or improperly formatted received signals;
means for time-aligning in frames, bits from the received signals;
means for determining a first majority logic state of the bits in each frame;
means for determining a second majority logic state not including the signal that least frequently has bits matching said first majority logic state; and
means for generating an output signal carrying plural bits wherein the logic state of each bit relates to said first majority logic state, and when there is not a majority logic state, the logic state of each bit relates to said second majority logic state.

9. The apparatus of claim 8, wherein said received signals are diverse in frequency.

10. The apparatus of claim 8, wherein said means for receiving signals are collocated.

11. The apparatus of claim 8, wherein said means for receiving signals are mutually geographically remote.

12. Signal processing apparatus, comprising:
plural means to receive a common signal;
means to synchronize to each other signals received at said receiver means, said synchronizing meas being operatively connected to said plural receiver means; and
a processor operatively connected to said synchronizing means for generating an output signal, said processor comprising,
means for determining the majority logic state of said synchronized signals,
a first means to generate an output signal related to said majority, and p2 a second means to generate an output signal if there is no said majority.

13. A method for processing signals, comprising the steps of:
(a) receiving at plural receivers a common signal of plural bits of information, bits being carried in plural frames;
(b) detecting bit transitions in said received signals that fall outside of predetermined windows;
(c) discarding said received bits having bit transitions falling outside of said windows;
(d) generating a character from a predetermined number of said received bits;
(e) comparing the generated character to a predetermined set of characters;
f) discarding the generated character that does not match of the predetermined characters;
(g) storing sequentially, for each received signal, a plurality of the bits with accepted bit transitions from accepted characters;
(h) withdrawing bits from said storage frame-by-frame so that withdrawn bits are aligned in time;
(i) determining the majority logic state of aligned bits in each frame;
(j) recording the frequency with which each received signal has valid bits in the logic state matching said majority logic state; and
(k) forming an output signal carrying plural output bits wherein the logic state of each output bit relates to said majority logic state, and when there is not a majority logic state, to a second logic state.

14. The method of claim 13, wherein said second logic state is related to the logic state of the corresponding bit in the received signal that most frequently has bits matching the majority logic state.

15. The method of claim 13, wherein said second logic state is related to the logic state of a second majority determined as in step (i) not including the received signal that least frequently has bits matching the majority logic state.

16. The method of claim 13, wherein said plural receivers are mutually geographically remote.

17. The method of claim 13, wherein said plural receivers are mutually frequency diverse.

18. The method of claim 13, wherein said plural receivers are collocated.

19. A method for processing signals, comprising the steps of:
(a) receiving plural signals carrying plural bits of information from a common signal;
(b) retaining only the received bits having predetermined timing and format;
(c) time-aligning in frames said retained bits;
(d) determining the majority logic state of said retained bits in each frame; and
(e) generating an output signal comprising output bits with the logic state of each output bit relating frame-by-frame to the logic state of said majority state, and if there was no majority state for a frame, relating to a second logic state.

20. Signal processing method comprising the steps of:
(a) receiving at plural receivers a common signal;
(b) synchronizing to each other signals received at said plural receivers;
(c) generating an output signal related to the majority of said received signals, and
(d) generating an alternative output signal if there is no majority.

21. In a signal processor that processes signals received on plural receivers, carrying plural framed bits of information from a common signal, with means for rejecting mistimed or improperly formatted receive signals, the improvement comprising:
means for time-aligning in frames, bits in the received signals;
means for determining the majority logic state of the bits in each frame from said receive signals;
means for generating an output signal carrying plural output bits, wherein the logic state of each output bit relates to said majority logic state, and when there is not a majority logic state, the logic state of each output bit relates to a second logic state.

22. The signal processor of claim 21, further comprising:
means for recording each received signal's history of having bits matching the logic state of the majority logic state; and
means to determine a second logic state related to the logic state of a second majority, not including the signal that least frequently has bits with a logic state matching the logic state of the majority logic state.

23. The signal processor of claim 21, further comprising:
means for recording each signal's history of having bits matching the logic state of the majority logic state; and
means to determine a second logic state related to the logic state of the corresponding bit in the received signal with the best history of having bits matching the majority logic state.

* * * * *